United States Patent

Kikuchi

[11] 4,004,249
[45] Jan. 18, 1977

[54] OPTICAL WAVEGUIDE LASER PUMPED BY GUIDED ELECTROMAGNETIC WAVE

[75] Inventor: Tom T. Kikuchi, Santa Barbara, Calif.

[73] Assignee: General Motors Corporation, Detroit, Mich.

[22] Filed: Jan. 22, 1976

[21] Appl. No.: 651,448

[52] U.S. Cl. .................. 331/94.5 P; 350/96 WG
[51] Int. Cl.² ................................ H01S 3/09
[58] Field of Search ............ 331/94.5; 330/4.3; 350/96 WG

[56] References Cited

UNITED STATES PATENTS

| | | | |
|---|---|---|---|
| 3,521,119 | 7/1970 | Ahmed et al. | 331/94.5 PE |
| 3,949,318 | 4/1976 | Zeidler | 350/96 WG |

FOREIGN PATENTS OR APPLICATIONS

| | | | |
|---|---|---|---|
| 986,042 | 3/1965 | United Kingdom | 331/94.5 |

OTHER PUBLICATIONS

Kikuchi, 35-GHz Microwave VUV Atomic Line Source, Applied Optics, vol. 11, (Mar. 1972), p. 687.

*Primary Examiner*—William L. Sikes
*Attorney, Agent, or Firm*—Warren D. Hill

[57] ABSTRACT

An electromagnetic waveguide having a large cross section portion tapering to a narrow throat is supplied with microwaves in the large portion to produce a high intensity electric field in the throat. An optical waveguide defined by the throat itself or a separate waveguide tube in or adjacent the throat is supplied with a laser medium which is pumped by the high intensity electric field to produce a lasing action. Suitable mirrors aligned with the optical waveguide complete the optical laser cavity. Alternatively several tapered waveguides in series with a common optical waveguide are excited sequentially to progressively pump the laser medium along the optical waveguide tube so that laser emission is effected without mirrors.

5 Claims, 6 Drawing Figures

OPTICAL WAVEGUIDE LASER PUMPED BY GUIDED ELECTROMAGNETIC WAVE

This invention relates to lasers and particularly to optical waveguide lasers pumped by microwave energy.

Due to requirements for high energy, high power and compact lasers; much development work has been done on laser excitation schemes. Contrary to a prevalent notion that exciting microwaves cannot be coupled effectively to the discharge and cannot be localized, it has now been found that microwaves can be used efficiently for high energy and high level excitation.

It is therefore an object of the invention to provide apparatus for efficiently coupling a microwave pumping source to a laser medium in an optical waveguide.

It is a further object of the invention to provide intense electrical fields by microwave techniques for pumping a laser medium in an optical waveguide which helps to concentrate optical radiation in the region of the intense field.

The invention is carried out by providing a tapered electromagnetic waveguide having a narrow throat area coupled to a microwave source for producing a high intensity electric field at the waveguide throat and an optical waveguide within the high intensity field containing laser material which is pumped by the intense field.

The invention is further carried out alternatively by providing an optical waveguide defined by the tapered electromagnetic waveguide or by a separate optical waveguide tube in the region of intense electrical field.

The above and other advantages will be made more apparent from the following specification taken in conjunction with the accompanying drawings wherein like reference numerals refer to like parts and wherein.

Figure 1:
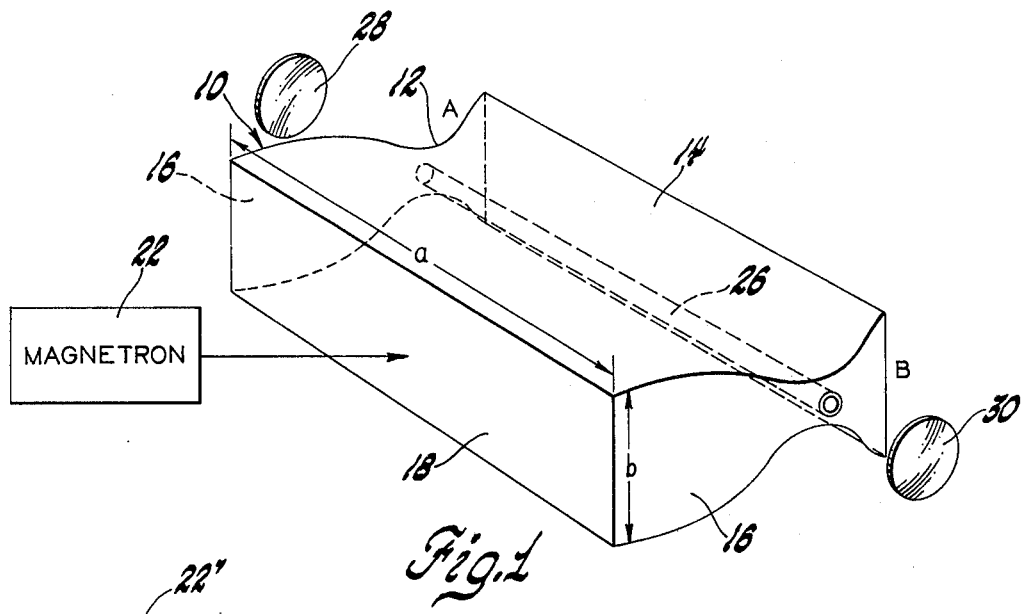
FIG. 1 is a perspective view of one embodiment of a laser according to the invention.

Referring to FIG. 1, a tapered microwave waveguide 10 has a large cross section portion of length $a$ and a wide portion of width $b$. The waveguide 10 gradually tapers down to a narrow throat portion 12 and then flares out into a horn 14. The waveguide cavity is enclosed by side walls 16 and has an opening 18 across the wide portion. A magnetron 22 has its output coupled to the opening 18 by a rectangular waveguide, not shown. An elongated optical waveguide 26 is located in the throat 12 of the tapered waveguide and a laser medium is contained within the optical waveguide 26.

In accordance with conventional laser technology, a fully reflecting mirror 28 and a partially transmitting mirror 30 are aligned with the axis of the optical waveguide 26 to define the optical laser cavity.

As a specific example, the microwave waveguide is formed of copper, the length $a$ of the waveguide is 25 cm, the width $b$ is 4 cm, the distance of the opening 18 to the throat 12 is 25 cm and the width of the throat is 3 mm. The horn 14 extends approximately 20 cm beyond the throat 12. The optical waveguide 26 is capillary tube of dielectric material such as quartz and the laser medium within the tube is $CO_2$ + He + $N_2$. The magnetron 22 provides 2450 MHz electromagnetic radiation at a pulsed peak power level of 20 kw.

In operation, the microwave is injected through the opening 18 and then directed toward the throat 12 of the waveguide. At the throat of the waveguide 10, the electrical field reached a high value such as to sustain a gaseous discharge in the region of the optical wave guide 26. For the example given, the value of the electric field reaches up to 1330 volts per cm.

It has been found that by using the tapered waveguide to concentrate the microwave energy in the region of the laser medium, a high coupling efficiency is attained. In addition, the optical waveguide helps to concentrate the optical radiation in the region of the intense electrical field to attain a high gain characteristic. Using these principles, many variations of the apparatus are possible to optimize efficiency and to reach specific objectives. For example, the opening 18 may be replaced by an adjustable tuning stub and the microwaves may be injected through the wall 16. In addition the throat 12 may advantageously be made to flare out somewhat toward the sides 16, that is, the throat width may increase gradually toward the mirrors to improve impedance matching. The sides 16 can be tapered inwardly to reduce the microwave group velocity to further increase the energy density of excitation.

Figure 2:
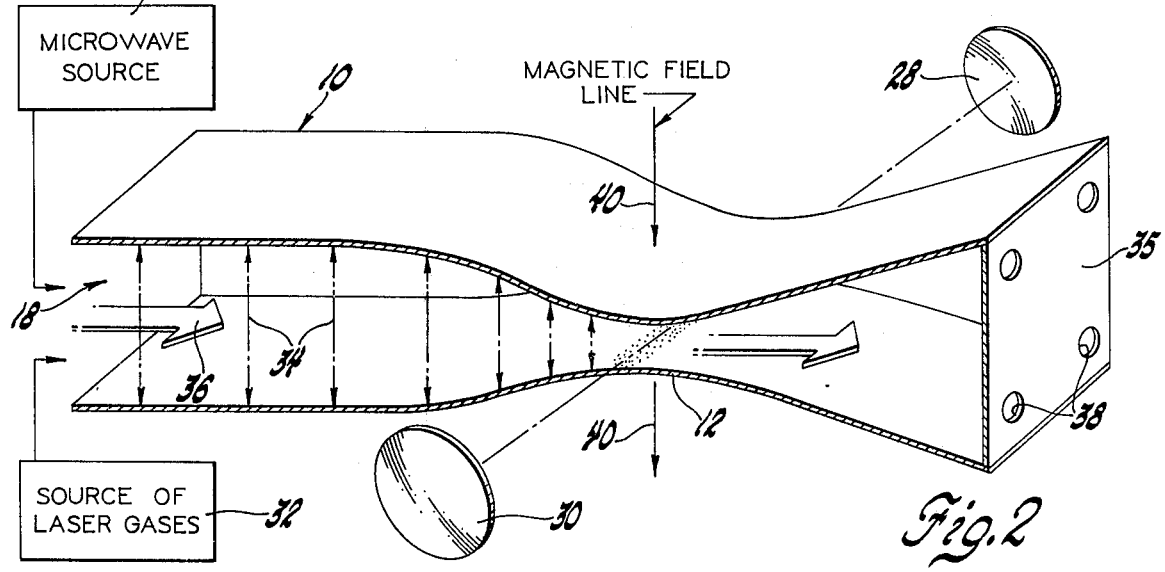
FIG. 2 is a perspective sectional view of another embodiment of a laser according to the invention.

Another variation is shown in FIG. 2, wherein the throat 12 of the waveguide 10 defines an open sided optical waveguide or an H waveguide. That is, the optical radiation is constrained in one direction by the reflective inner surfaces in the waveguide throat. Microwaves from source 22' are coupled through the opening 18 of the tapered waveguide 10 and gases comprising the laser medium are also fed into the waveguide cavity through the opening 18 from a source 32 As indicated by field lines 34, the microwaves propagate through the waveguide 10 into the throat 12 to produce a high intensity electric field. The horn 14 may be open, however, to improve the efficiency of excitation, the horn 14 is closed by a shorted wall 35 spaced from the throat 12 by an odd number of quarter wavelengths. Then the microwave radiation will be reflected back toward the throat to reinforce the electric field there. Apertures 38 in the corners of the shorted wall 35 or in the walls of the horn provide gas exhaust openings. The active laser gases indicated by the arrow 3 likewise flow through the waveguide, through the throat 12 and are exhausted through the apertures 38 Mirrors 28 and 30 aligned with the axis of the throat complete the optical laser cavity. Conventional Brewster windows, not shown, are provided as required and may be integrally mounted on the side walls of the tapered waveguide 10.

Figure 3:
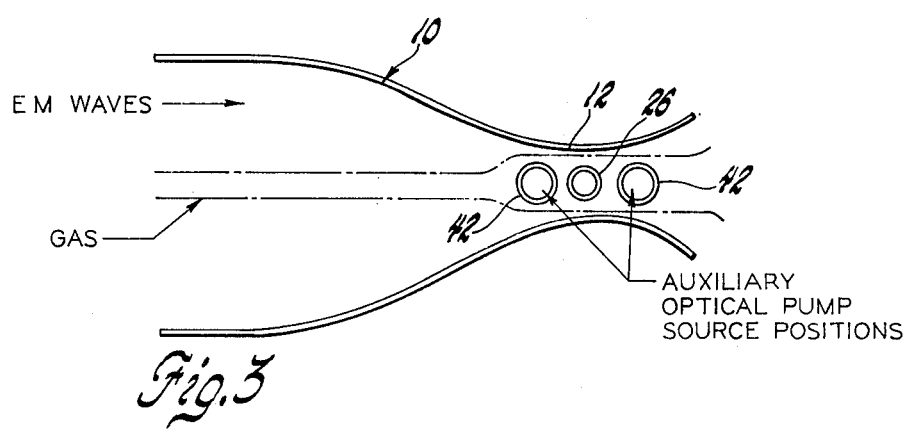
FIG. 3 is a schematic cross-sectional view of a laser according to still another embodiment of the invention.

The high intensity, electrical discharge occurring in the throat 12 is coupled into the laser gases flowing through the throat to directly excite the laser gases and effect lasing action in the open sided optical waveguide defined by the throat 12. As indicated by the arrows 40 representing magnetic field lines, a magnetic field easily applied to the laser region due to the narrow gap across the throat. The magnetic field helps contain the electrons and ions with greater ease for exciting the laser medium and in addition, provides means for amplitude and frequency modulation of the laser output Rather than directly exciting the laser medium by the high intensity electrical discharge in the throat, the discharge may excite the gases to produce optical radiation which in turn optically pumps the laser medium. The production of optical radiation in a tapered waveguide is previously known as described in the article, Kikuchi, T. T. "35-GHz Microwave VUV Automic Line Source," *Applied Optics*, Vol. 11, p. 687, March 1972. Alternatively as shown in FIG. 3, one or more auxiliary optical pumping sources 42 may be placed adjacent to the optical waveguide 26 to optically pump the laser material placed in the optical waveguide. The auxiliary optical pumping source 26 comprises regions of flowing gases adjacent the optical waveguide position or gases confined to transparent tubes parallel to the optical axis and adjacent to the optical waveguide 26, which gases are excited by the high intensity electrical field.

The microwave excitation technique can also be applied to set up a pulsed traveling wave of excitation along the laser material. This is particularly useful for eliminating laser mirrors and for lasing of materials with very short lasing transition time, such as copper vapor (5105A line). As an example, the traveling wave can be set up progressively exciting the various portions of the laser material along the axis of the laser cavity sequentially in time as well as spatially such that the excitation just precedes the lasing wave packet.

Figure 4:
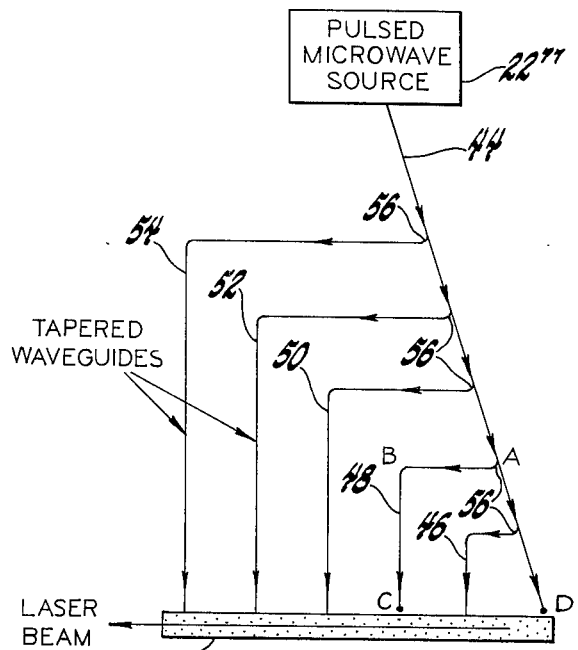
FIG. 4 is a schematic diagram of a microwave coupling scheme for a traveling wave mode of operating the laser according to the invention.

An apparatus for implementing this scheme is schematically shown in FIG. 4 which includes an optical waveguide 26' which is sufficiently long to extend through the throats of several tapered waveguides aligned side-by-side in series. In this case the optical waveguide may comprise either the open sided optical waveguide as shown in FIG. 2 or a dielectric tube as shown in FIG. 1. A main waveguide 44 is coupled to a pulsed microwave source 22" at one end and is coupled to the right end of the optical waveguide 26'. A plurality of branching waveguides 46, 48, 50, 52 and 54 are coupled to the main waveguide 44 by directional couplers 56 and terminate in tapered portions with their throat sections aligned with the optical waveguide 26'. Each waveguide branch, shown as a line in the drawings, represents a waveguide structure like that of FIG. 1 or FIG. 2. The length of each waveguide 46 through 54 is chosen so that the excitation of each portion of the optical waveguide 26' is achieved just prior to the arrival of the lasing wave packet which is started at the right end of the waveguide 26' and travels to the left. Thus the wave packet is amplified as it progresses through each tapered waveguide 46 through 54 so that an adequate gain is achieved without mirrors.

This technique is particularly useful for a system with very high gain and/or a system with a relatively slow process of depopulation of the lower state as compared to the fast spontaneous emission rate so that the laser terminal state does not quickly populate excessively. The traveling wave excitation provides means of maintaining population inversion in that portion of the active medium in which the laser beam wave packet is just about to enter. Through this technique, the effect of reabsorption of the laser radiation is minimized because the laser beam does not act upon that portion of the laser material in which the energy has just been extracted. After the excited energy is extracted from the system, the lower lasing terminal state is allowed to depopulate again by employing gas flow or some other depopulation scheme. When the depopulation process is completed, the microwave source is again pulsed to start another laser pulse.

Figure 6:
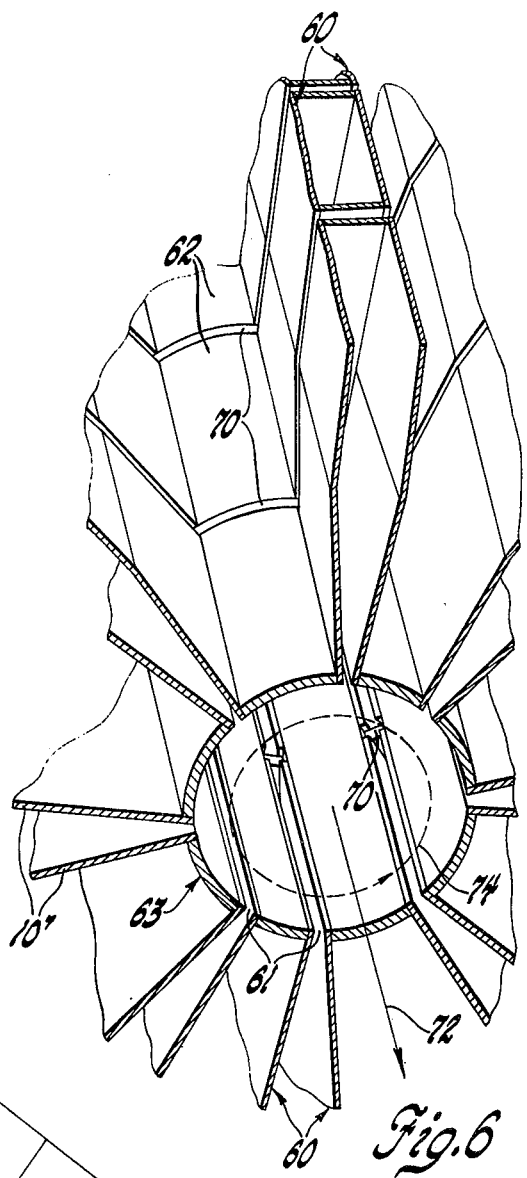
FIG. 6 is an enlarged view of a section of FIG. 5.
Figure 5:
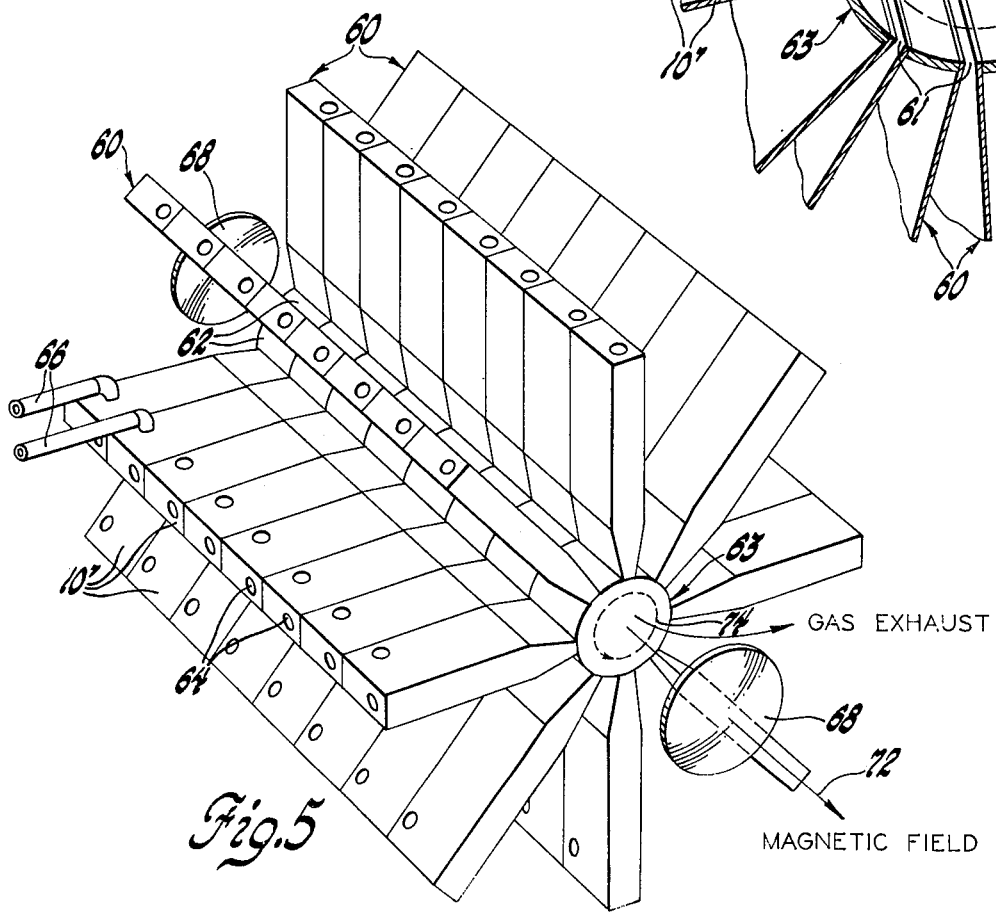
FIG. 5 is a perspective view of still another embodiment of a laser according to the invention.

FIGS. 5 and 6 show a cylindrical array of tapered microwave waveguides 10' arranged in several linear banks 60 of waveguides 10' with several waveguides positioned side by side in each bank. Each waveguide is directed radially toward the center of the assembly. The tapered portion of each waveguide terminates at its narrowest portion to define a slit 61 discharging microwave energy into the center of the assembly. Arcuate strips 62 of either conductive or dielectric material join the inner tapered ends of each bank 60 to define a hollow cylindrical optical waveguide 63 (containing the slits 61) at the center of the assembly. The outer end of each waveguide 10' is provided with a port 64 to permit active laser gas to be fed into each waveguide. The gas passes through the waveguide 10' into the optical waveguide 63 and is discharged from the ends of the optical waveguide. Coaxial microwave cables 66 (only two shown) are coupled into the sidewall of each waveguide 10' near the outer end to energize the waveguide from a microwave source, not shown. The microwave source need not be a single unit but may comprise a battery of microwave generators, each feeding one or more of the waveguides 10'. Conventional laser mirrors 68 are axially aligned with the optical waveguide 63 to complete the optical cavity.

FIG. 6 is an enlarged section of FIG. 5 and shows the adjacent tapered waveguides to be slightly spaced axially, at least in the region of the optical waveguide 63. Conductive coils 70 between adjacent waveguides 10' and surrounding the optical waveguide 63 are connected to a source of D.C. current, not shown, to produce an axial magnetic field 72 in the optical waveguide.

In operation, laser gas is passed through each waveguide 10' and each waveguide is excited via the coaxial cables 66. An intense electrical field is produced at the slit 61 of each waveguide 10' where it is discharged into the optical cavity 63 along with the laser gas. There the gas is excited to produce laser action. To optimize the laser operation, the excitation of the several banks 60 is phase controlled to produce a rotating electrical field in the optical waveguide. Then the exciting electrons produced in the gaseous discharge in the magnetic field will achieve circular motion about the optical axis as shown by the dotted path 74. Proper phasing of the microwave excitation allows the acceleration of the electrons to a relatively narrow velocity spread. Thus the electrons are not only conserved in the optical waveguide but the selectivity of electron energy spread is improved such that it increases the pumping of any given energy state.

The configuration of FIGS. 5 and 6 can also be operated in the traveling wave mode as described above for FIG. 4, thus making the mirrors 68 unnecessary. In this case the waveguides 10' in each bank are excited sequentially from one end of the bank toward the other in the manner shown in FIG. 4. The controlled phase relationship between the banks to produce the rotating electrical field is superimposed on the traveling wave excitation in each bank to maintain the high efficiency of that arrangement.

It will thus be seen that the tapered microwave waveguide concentrates high intensity electrical energy in the lasing region and the optical waveguide concentrates the optical radiation in that region to foster high gain characteristics and that through these techniques efficient microwave coupling to the laser medium is achieved thereby providing a laser which has high energy, high power and compactness.

The embodiments of the invention in which an exclusive property or privilege is claimed are defined as follows:

1. Means for pumping an optical waveguide laser comprising
   means for generating high energy density electromagnetic waves including a tapered waveguide having a wide portion gradually diminishing to a narrow throat portion which is elongated along an axis, and a source of electromagnetic waves coupled to the wide portion so that high energy density electromagnetic waves are produced in the region of the throat portion, and
   an elongated optical waveguide defined in the region of the throat portion and extending parallel to the said axis, the optical waveguide containing laser material whereby the high energy density electromagnetic waves are coupled to the laser material for pumping thereof.

2. Means for pumping an optical waveguide laser comprising
   means for generating high energy density electromagnetic waves including a tapered waveguide having a wide portion gradually diminishing to a narrow throat portion which is elongated along an axis, and a source of electromagnetic waves coupled to the wide portion so that high energy density electromagnetic waves are produced in the throat portion, and
   an elongated optical waveguide tube located in the throat portion and extending along the said axis, the optical waveguide containing laser material whereby the high energy density electromagnetic waves are coupled to the laser material for pumping thereof.

3. Means for pumping an optical waveguide laser comprising
   means for generating high energy density electromagnetic waves including a tapered waveguide having a wide portion gradually diminishing to a narrow throat portion which is elongated along an axis, and a source of electromagnetic waves coupled to the wide portion so that high energy density electromagnetic waves are produced in the throat portion, and
   an elongated open sided optical waveguide in the throat having two opposed sides defined by the walls of the throat portion,
   and means for passing a fluent laser material into the wide portion of the tapered waveguide and through the narrow throat portion whereby the high energy density electromagnetic waves are coupled to the laser material in the throat portion for pumping thereof.

4. An optical waveguide laser comprising
   a series of adjacent tapered microwave waveguides, aligned along an axis,
   each microwave waveguide having a wide portion gradually diminishing to a narrow throat portion which is elongated about the said axis,
   an elongated optical waveguide defined in the region of the throat portions and extending parallel to the said axis, the optical waveguide containing laser material,
   and a source of electromagnetic waves coupled to the wide portions of the waveguides so that high energy density electromagnetic waves are produced at the optical waveguide in a traveling wave mode progressively extending along the optical waveguide whereby the high energy density electromagnetic waves are coupled to the laser material for pumping thereof progressively along the optical waveguide.

5. An optical waveguide laser comprising
   an elongated optical waveguide
   a plurality of banks of tapered microwave waveguides radially extending to the optical waveguide, each bank of waveguides including a plurality of tapered microwave waveguides aligned along the optical waveguide, each tapered waveguide comprising a wide portion gradually diminishing to a narrow throat portion terminating at the optical waveguide,
   means for passing laser gases through the tapered waveguides to the optical waveguide,
   and means for coupling microwave energy from a source to the wide portion of each tapered waveguide so that high energy density microwaves are produced in the narrow throat portion and are injected into the optical waveguide for coupling to the laser gases for pumping thereof.

* * * * *